United States Patent [19]

Fukui et al.

[11] 4,351,880

[45] Sep. 28, 1982

[54] PREVENTION OF ADHESION OF EPOXY RESINS

[75] Inventors: Shosin Fukui, Toyonaka; Masayoshi Shinjo, Osaka, both of Japan

[73] Assignee: Daikin Kogyo Co., Ltd., Osaka, Japan

[21] Appl. No.: 252,146

[22] Filed: Apr. 8, 1981

Related U.S. Application Data

[62] Division of Ser. No. 126,173, Feb. 29, 1980, abandoned.

[30] Foreign Application Priority Data

Mar. 1, 1979 [JP] Japan .................................. 54-24359
Oct. 5, 1979 [JP] Japan ................................ 54-129046

[51] Int. Cl.$^3$ ................................................ D02G 3/00
[52] U.S. Cl. ......................................... 428/378; 428/413; 428/421; 428/463; 427/58; 427/79; 427/156; 427/259; 427/282; 427/287; 427/410; 361/306
[58] Field of Search ............... 427/58, 79, 80, 156, 427/259, 282, 284, 289, 410; 174/52 PE, 110 FL, 110 E; 156/289; 264/338; 106/38.22, 38.25; 428/421, 378, 413, 463; 361/306

[56] References Cited

U.S. PATENT DOCUMENTS

| 3,345,424 | 10/1967 | Hauptschein et al. | 106/38.22 |
| 3,386,977 | 6/1968 | Kleiner | 526/245 |
| 3,412,179 | 11/1968 | Kleiner | 526/248 |
| 3,767,728 | 10/1973 | Langsam et al. | 428/421 |
| 3,844,999 | 10/1974 | Petrella | 260/29.6 F |
| 3,919,183 | 11/1975 | Jager | 526/248 |
| 3,950,298 | 4/1976 | McCown | 526/248 |
| 4,032,495 | 6/1977 | Perronin | 260/29.6 F |
| 4,100,340 | 7/1978 | Waldmann | 526/245 |
| 4,171,415 | 10/1979 | Kleiner | 526/243 |

FOREIGN PATENT DOCUMENTS

7705777   5/1977   Sweden .................................. 427/58

*Primary Examiner*—Norman Morgenstern
*Assistant Examiner*—Richard Bueker
*Attorney, Agent, or Firm*—Birch, Stewart, Kolasch & Birch

[57] ABSTRACT

A composition for preventing the adhesion of an epoxy resin which comprises a polymer of (A) at least one $C_4$ to $C_{21}$ perfluoroalkyl group-containing polymerizable compound with or without at least one compound copolymerizable therewith, the content of the component (A) being not less than 40% by weight on the weight of the polymer.

17 Claims, No Drawings

PREVENTION OF ADHESION OF EPOXY RESINS

This application is a divisional of copending application Ser. No. 126,173, filed on Feb. 29, 1980, now abandoned.

The present invention relates to prevention of adhesion of epoxy resins. More particularly, it relates to prevention of adhesion of epoxy resins to lead wires in case of coating of condenser surfaces therewith.

Epoxy resins are widely used as moisture-preventing and protecting materials for ceramic condensers and chemical condensers. Coating of condenser surfaces with such moisture-preventing and protecting materials is effected by immersing a condenser into a moisture-preventing agent and then subjecting the immersed product to curing. In this coating operation, epoxy resins may sometimes adhere to lead wires connected to the condenser body. When such a condenser is placed into a print substrate plate, for example, proper wiring may be sometimes hindered by the epoxy resin adhering to lead wires.

Epoxy resins show a strong adhesive power, as understood from the fact that they are widely used as adhesives. Therefore, when once they adhere to lead wires, it is very difficult to peel off them.

For the purpose of preventing adhesion of epoxy resins to lead wires, an emulsion of silicone oil has hitherto been employed. But, the adhesion-preventing property against epoxy resins is insufficient so that a satisfying effect has not been obtained. When a high concentration of silicone oil is adopted in order to improve the effect, a coating film is formed on the surface of the treated lead wire due to the creeping property of silicone oil, and because of a high insulating property of silicone oil, the passage of electricity is hindered at the joint part between the lead wire in the condenser and another conducting wire, which results in impossible operation of the finally assembled apparatus.

As the result of an extensive study seeking any effective agent for prevention of adhesion of epoxy resins to lead wires, particularly in manufacture of condensers, it has now been found that a polymer of a $C_4$ to $C_{21}$ perfluoroalkyl group-containing polymerizable compound with or without any other copolymerizable compound in a certain amount is quite suitable for such purpose.

According to the preset invention, a polymer of (A) at least one $C_4$ to $C_{21}$ perfluoroalkyl group-containing polymerizable compound with or without (B) at least one compound copolymerizable therewith in an amount of not more than 60% by weight on the total weight of the components (A) and (B) is used as an adhesion-preventing agent against epoxy resins.

The said polymer can usually prevent the adhesion of an epoxy resin. In order to make the adhesion-preventing effect surely and satisfactorily exerted, however, the content of the component (B) is preferred to be not more than 10% by weight. In other words, the content of the component (A) in the polymer is favorable to be from 90 to 100% by weight.

Depending on the kinds of the copolymerizable compounds as the component (B), however, the said preferable range for the content of the component (B) may be broadened. When, for instance, one or more chosen from $C_{12}$ to $C_{18}$ alkyl acrylates and $C_{12}$ to $C_{18}$ alkyl methacrylates are used as the component (B), the resulting polymer can exert substantially a sufficient adhesion-preventing effect even if the content of the component (B) is increased up to about 60% by weight.

The $C_4$ to $C_{21}$ perfluoroalkyl group-containing polymerizable compound as the component (A) may be the one having a $C_4$ to $C_{21}$ perfluoroalkyl group at one end of the molecule and a carbon-carbon double bond at the other end, of which specific examples are as follows:

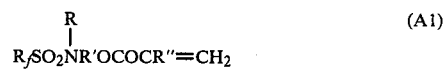
(A1)

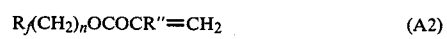
(A2)

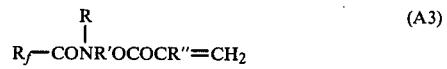
(A3)

(A4)

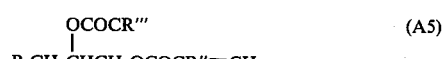
(A5)

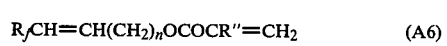
(A6)

wherein $R_f$ is a $C_4$ to $C_{21}$ perfluoroalkyl group, R is a hydrogen atom or a $C_1$ to $C_{10}$ alkyl group, R' is a $C_1$ to $C_{10}$ alkylene group, R'' is a hydrogen atom or a methyl group, R''' is a $C_1$ to $C_{17}$ alkyl group and n is an integer of 1 to 10.

Examples of the copolymerizable compounds as the component (B) are as follows:

(B1) Acrylic acid and methacrylic acid, and their methyl, ethyl, butyl, isobutyl, propyl, 2-ethylhexyl, hexyl, decyl, β-hydroxyethyl and glycidyl esters;

(B2) Vinyl esters of fatty acids such as acetic acid, propionic acid, caprylic acid, lauric acid and stearic acid;

(B3) Styrene compounds such as styrene, α-methylstyrene and p-methylstyrene;

(B4) Halogenated vinyl or vinylidene compounds such as vinyl fluoride, vinyl chloride, vinyl bromide, vinylidene fluoride and vinylidene chloride;

(B5) Allyl esters of fatty acids such as allyl heptanoate, allyl caprylate and allyl capronate;

(B6) Vinyl alkyl ketones such as vinyl methyl ketone and vinyl ethyl ketone;

(B7) Acrylamides such as N-methylacrylamide, N-methylolmethacrylamide, glycidyl acrylate and glycidyl methacrylate; and (B8) Dienes such as 2,3-dichloro-1,3-butadiene and isoprene.

Among them, preferred are acrylic esters, methacrylic esters and styrene compounds. Particularly preferred are $C_{12}$ to $C_{18}$ alkyl acrylates and $C_{12}$ to $C_{18}$ alkyl methacrylates because of the reason as hereinabove stated. In addition to these preferred copolymerizable compounds, other copolymerizable compounds may be used as the component (B). In such case, it is desirable that the amount of the other copolymerizable compounds is not more than 15% by weight of the weight of the perfluoroalkyl group-containing polymerizable compounds as the component (A) and not more than the weight of the said preferred copolymerizable compounds.

In general, a larger proportion of the component (A) in the polymer is favorable from the viewpoint of a better adhesion-preventing property. From the viewpoint of a higher solubility into organic solvents, however, a larger proportion of alkyl acrylates or alkyl methacrylates as the component (B) is favorable. Since the polymer as the adhesion-preventing agent is usually employed in the form of aqueous dispersion or organic solvent solution, a higher solubility into organic solvents is preferred from this point of view. Thus, the polymer consisting of units of the $C_4$ to $C_{21}$ perfluoroalkyl group-containing polymerizable compound with or without units of $C_{12}$ to $C_{18}$ (preferably $C_{16}$ to $C_{18}$) alkyl acrylate or methacrylate in a weight proportion of 100:0 to 40:60, particularly of 90:10 to 40:60, is the most favorable.

The polymer of the invention may be prepared by any suitable polymerization procedure such as bulk polymerization, solution polymerization, suspension polymerization, emulsion polymerization or radiation polymerization.

For example, the compounds to be polymerized are dissolved in an appropriate organic solvent, and the resultant solution is subjected to solution polymerization in the presence of a polymerization initiator such as a peroxide or an azo compound soluble in the organic solvent or by ionizable radiation. Further, for example, the compounds to be polymerized are emulsified into water in the presence of a surface active agent, and emulsion polymerization is carried out in the presence of a polymerization initiator such as a peroxide or an azo compound or by ionizable radiation.

For the practical use as an adhesion-preventing agent, the polymer of the invention is formulated into an aqueous suspension or an organic solvent solution, usually containing the polymer in a concentration of 0.2 to 3% by weight, preferably of 0.5 to 1.5% by weight. When desired, any dispersing aid such as an emulsifier may be used.

Examples of the organic solvent to be used for formulation of the organic solvent solution are chlorinated solvents (e.g. methylchloroform, trichloroethylene, tetrachloroethylene), fluorinated solvents (e.g. trichlorotrifluoroethane, tetrachlorodifluorethane, metaxylene hexafluoride), hydrocabons (e.g. toluene, xylene, benzene), ketones (e.g. methyl isobutyl ketone, acetone), esters (e.g. ethyl acetate, butyl acetate), ethers (e.g. diethyl ether), etc. Among them, the use of chlorinated solvents is particularly preferred.

As the emulsifier, an anionic, cationic or nonionic one may be employed, but a cationic or nonionic emulsifier is particularly preferable. Specific examples of anionic emulsifiers are sodium salt of sulfated alkenyl acetate having 16 to 18 carbon atoms, sodium oleate, sodium salt of sulfated methyl oleate, ammonium $\omega$-H-polyfluoroalkanoate having 8 to 10 carbon atoms, ammonium perfluoroalkanoate, $C_{10}$ to $C_{18}$ alkyl sodium sulfate, sodium $C_{12}$ to $C_{18}$ alkylbenzenesulfonate, sodium alkylnaphthalenesulfonate, etc. Specific examples of cationic emulsifiers are (dodecylmethylbenzyl)trimethylammonium chloride, benzyldodecyldimethylammonium chloride, N-[2-(diethylamino)ethyl]oleamide hydrochloride, dodecyltrimethylammonium acetate, trimethyltetradecylammonium chloride, hexadecyltrimethylammonium chloride, trimethyloctadecylammonium chloride, etc. Specific examples of nonionic emulsifiers include condensation products of ethylene oxide with hexylphenol, isooctylphenol hexadecanol, oleic acid, $C_{12}$ to $C_{18}$ alkanethiols or $C_{12}$ to $C_{18}$ alkylamines.

The application of the adhesion-preventing composition to a substrate may be effected, for instance, by simple immersion of an electrically conductive substrate such as lead wire of an electrical product such as a condenser into the composition, followed by drying in the air.

Onto the substrate applied the adhesion-preventing agent of the invention, adhesion of epxoy resins does not substantially take place. Even if the adhesion occurs by chance, the adhering epoxy resin can be readily eliminated with a finger. When the thus treated substrate (e.g. metal wire) is joined, for instance, with another metal by soldering, no material influence is exerted upon the soldering property, and hindrance of passage of electricity is not caused.

The present invention will be hereinafter explained further in detail by the following Examples and Comparative Examples.

EXAMPLE 1

A compound of the formula:

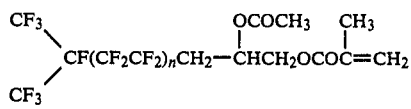

(a mixture of the compounds of n=3, 4 and 5 in a weight ratio of 4:2:1) (32 g), 2-ethylhexyl methacrylate (0.8 g) and glycidyl methacrylate (0.8 g) are dissolved in a mixture of acetone (23 g), tetrachlorodifluoroethane (128 g) and trichlorotrifluoroethane (50 g), and the resultant solution is charged into a 300 ml volume four-necked flask. After the inner atmosphere is replaced by nitrogen gas, a 70% by weight solution of t-butyl peroxypivalate (3 g) in paraffin is dropwise added, and polymerization is carried out at 55° C. for 7 hours. Then, a 70% by weight solution of t-butyl peroxypivalate (3 g) in paraffin is dropwise added, and the polymerization is continued at the same temperature for further 7 hours. By this polymerization, a solution (230 g) containing 14.2% by weight of the copolymer is obtained.

EXAMPLE 2

Into a 300 ml volume flask, a compound of the formula:

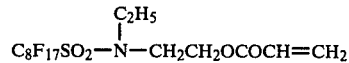

(30 g), an emulsifying agent (dimethyloctadecylamine acetate, 1.5 g), acetone (15 g) and water (165 g) are charged. Then, the inner atmosphere is replaced by nitrogen gas under stirring and heated on a water bed. When the inner temperature is elevated up to 55° C., a solution of azobisisobutyronitrileamidine hydrochloride (0.2 g) in water (10 g) is dropwise added to the flask, and polymerization is continued at 60° C. for 2 hours to obtain a emulsified dispersion (210 g) containing 14% by weight of a homopolymer of the said compound.

Polymers used in the following Examples are ones obtained in Examples of 1 and 2 or prepared as in Examples 1 and 2.

EXAMPLES 3 TO 10 AND COMPARATIVE EXAMPLES 1 TO 3

The top portion (2 cm) of a condenser lead wire (7 cm) is immersed into an adhesion-preventing composition shown in Table 1 and dried at room temperature until the solvent or water is removed off. Then, the top portion (5 cm) of the wire is immersed into an epoxy resin composition and taken out from the composition. After kept at room temperature for 10 minutes, the wire is heated at 120° C. for 1 hour in a thermostat to cure the epoxy resin.

The appearance of the top portion of the wire on which the adhesion-preventing agent is applied is observed. The determination of the adhesion-preventing property is made according to the following criteria:

⊚: No epoxy resin adheres to the portion treated with the adhesion-preventing agent.

○: A small amount of epoxy resin adheres to the portion treated with the adhesion-preventing agent, but it can be readily eliminated by slight tough of a finger.

Δ: Epoxy resin adheres in spots to the portion treated with the adhesion-preventing agent, but it can be eliminated with a finger.

×: No effect of the adhesion-preventing agent is seen, and epoxy resin adheres to the portion treated with the agent similarly as in the portion not treated with the agent.

The results are shown in Table 1.

merization is continued at the same temperature for further 7 hours. By this polymerization, a solution (230 g) containing 13.7% by weight of the copolymer is obtained.

EXAMPLE 12

Into a 300 ml volume flask, a compound of the formula:

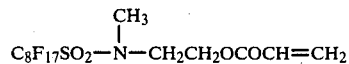

(40 g), lauryl methacrylate (20 g), a cationic surface active agent ("Cation AB" manufactured by Nippon Oil and Fats Co., Ltd.) (1.5 g), a nonionic surface active agent ("Nonion HS-220" manufactured by Nippon Oil and Fats Co., Ltd.) (2.2 g), acetone (45 g), ethylene glycol (3 g) and pure water (123.3 g) are charged, and the inner atmosphere is replaced by nitrogen gas. The temperature is elevated up to 60° C., and stirring is carried out for 30 minutes. Then, a solution of azobisisobutyronitrileamidine hydrochloride (0.30 g) in water (5 g) is added to the flask, and emulsion polymerization is continued. By this polymerization, an aqueous dispersion (238 g) containing 23.7% by weight of the copolymer is obtained.

EXAMPLES 13 TO 25

TABLE 1

| | | Adhesion-preventing composition | | | |
|---|---|---|---|---|---|
| Example | | Polymer | Solvent | Concentration (%) | Adhesion preventing effect |
| Ex. | 3 | Polymer obtained in Example 1 | $CCl_2FCClF_2$ | 1 | ⊚ |
| | 4 | Polymer obtained in Example 1 | $CCl_2FCClF_2$ | 0.3 | ○ |
| | 5 | Copolymer of $CF_3(CF_2CF_2)_3CH_2CH_2OCOCH=CH_2$ and styrene in a weight ratio of 95:5 | $CCl_2FCClF_2$ | 1.5 | ⊚ |
| | 6 | Copolymer of $CF_3(CF_2CF_2)_3CH_2CH_2OCOCH=CH_2$ and styrene in a weight ratio of 95:5 | $CCl_2FCClF_2$ | 0.5 | ⊚ |
| | 7 | Polymer obtained in Example 2 | Aqueous dispersion | 2 | ⊚ |
| | 8 | Polymer obtained in Example 2 | Aqueous dispersion | 1 | ○ |
| Comparative Ex. | 1 | — | — | — | × |
| | 2 | Silicone emulsion* | Water | 35 | Δ |
| | 3 | Silicone emulsion* | Water | 1 | × |
| | 9 | Copolymer of $CF_3(CF_2CF_2)_3CH_2CH_2OCOCH=CH_2$ and styrene in a weight ratio of 80:20 | m-Xylene hexafluoride | 5 | Δ |
| | 10 | Copolymer of $CF_3(CF_2CF_2)_3CH_2CH_2OCOCH=CH_2$ and styrene in a weight ratio of 80:20 | m-Xylene hexafluoride | 1 | Δ |

Note:
*Toray Silicone Co., Ltd., "SH-7036".

EXAMPLE 11

A compound of the formula:

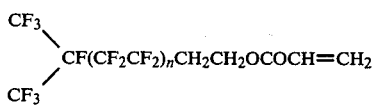

(a mixture of the compounds of n=3, 4 and 5 in a weight ratio of 4:2:1) (25.6 g) and stearyl acrylate (6.4 g) are dissolved in methylchloroform (200 g), and the resultant solution is charged into a 300 ml volume four-necked flask. After the inner atmosphere is replaced by nitrogen gas, a 70% by weight solution of t-butyl peroxypivalate (0.3 g) in paraffin is dropwise added, and polymerization is carried out at 55° C. for 7 hours. Then, a 70% by weight solution of t-butyl peroxypivalate (0.3 g) in paraffin is dropwise added, and the poly- The solubility and the adhesion-preventing property of various kinds of copolymers are examined.

The test for solubility into organic solvents is effected by diluting the reaction product obtained by polymerization in methylchloroform and containing about 15% by weight of the copolymer with methylchloroform at room temperature to make a concentration of 0.5 to 2% by weight of the copolymer and observing the resultant dilution macroscopically to confirm whether it is transparent or turbid.

The adhesion-preventing property is investigated after curing both at normal temperature and under heating.

In case of the composition in an organic solvent solution form, the adhesion-preventing property after curing at normal temperature is examined by immersing the top portion (10 cm) of a condenser lead wire into the above obtained 0.5 to 2% by weight dilution, taking out the wire from the dilution, drying it in the atmosphere for 1 minute under a windless condition, then immersing the top portion (20 cm) of the wire into an epoxy resin composition (viscosity 5000 c.s.), allowing it to stand for 1 minute in the atmosphere under a windless condition and observing the appearance of the wire so as to determine the adhesion-preventing property.

The determination is made according to the following criteria:

◉: Adhesion of epoxy resin to the portion treated with the adhesion-preventing agent is not observed.

○: A small amount of epoxy resin (about 10% or less of the lead wire surface) adheres to the portion treated with the adhesion-preventing agent.

▲: A relatively large amount of epoxy resin adheres to the portion treated with the adhesion-preventing agent.

For the test of adhesion-preventing property after curing under heating, the lead wire subjected to the test of curing at normal temperature (5 minutes after taking out) is heated at 120° C. for 1 hour to cure the epoxy resin, and the appearance of the wire is observed. The determination of the adhesion-preventing property is in the same manner as in Examples 3 to 8.

The results are shown in Table 2.

Production of the copolymers used in the compositions in a solution form is carried out as in Example 9.

TABLE 2

| | | Original liquid of copolymer | | | | Concentration of adhesion-preventing composition (% by weight) | Solubility | Test results — Adhesion-preventing property | |
|---|---|---|---|---|---|---|---|---|---|
| | | Composition of copolymer | | | | | | After curing at normal temperature | After curing under heating |
| | | Perfluoroalkyl group-containing polymerizable compound | % by weight | Copolymerizable compound | % by weight | Concentration (% by weight) | | | |
| Example No. | 13 | $CF_3$<br>$\ $<br>$\ \ \ \ CF(CF_2CF_2)_nCH_2CH_2OCOCH=CH_2$*<br>$/$<br>$CF_3$ | 80 | Stearyl acrylate | 20 | 13.7 | 0.5<br>1<br>2 | Soluble | ◉<br>◉<br>◉ | ◉<br>◉<br>◉ |
| | 14 | $CF_3$<br>$\ $<br>$\ \ \ \ CF(CF_2CF_2)_nCH_2CH_2OCOCH=CH_2$<br>$/$<br>$CF_3$ | 75 | Stearyl acrylate | 25 | 13.5 | 0.5<br>1<br>2 | Soluble | ○<br>○<br>○ | ○<br>○<br>○ |
| | 15 | $CF_3$<br>$\ $<br>$\ \ \ \ CF(CF_2CF_2)_nCH_2CH_2OCOCH=CH_2$<br>$/$<br>$CF_3$ | 85 | Stearyl acrylate | 15 | 13.6 | 1 | Soluble | ○ | ○ |
| | 16 | $CF_3$<br>$\ $<br>$\ \ \ \ CF(CF_2CF_2)_nCH_2CH_2OCOCH=CH_2$<br>$/$<br>$CF_3$ | 75 | Lauryl methacrylate | 25 | 14.0 | 1 | Slightly turbid | ○ | ○ |
| | 17 | $CF_3$<br>$\ $<br>$\ \ \ \ CF(CF_2CF_2)_nCH_2CH_2OCOCH=CH_2$<br>$/$<br>$CF_3$ | 75 | Stearyl methacrylate | 25 | 13.6 | 1 | Soluble | ○ | ○ |
| Example No. | 20 | $CF_3$<br>$\ $<br>$\ \ \ \ CF(CF_2CF_2)_nCH_2CH_2OCOCH=CH_2$<br>$/$<br>$CF_3$ | 75 | Isobutyl methacrylate | 25 | 19.8 | 1 | Turbid | ▲ | ▲ |
| | 21 | $CF_3$<br>$\ $<br>$\ \ \ \ CF(CF_2CF_2)_nCH_2CH_2OCOCH=CH_2$<br>$/$<br>$CF_3$ | 75 | 2-Ethylhexyl methacrylate | 25 | 17.6 | 1 | Turbid | ▲ | ▲ |
| | 22 | $CF_3$<br>$\ $<br>$\ \ \ \ CF(CF_2CF_2)_nCH_2CH_2OCOCH=CH_2$<br>$/$<br>$CF_3$ | 75 | 2-Ethylhexyl methacrylate | 25 | 19.0 | 2 | Turbid | ▲ | ▲ |
| Comparative Example No. | 23 | $CF_3$<br>$\ $<br>$\ \ \ \ CF(CF_2CF_2)_nCH_2CH_2OCOCH=CH_2$<br>$/$<br>$CF_3$ | 75 | 2-Ethylhexyl methacrylate | 25 | 18.3 | 3 | Turbid | ▲ | ○ |

TABLE 2-continued

| | Original liquid of copolymer | | | | | | | Test results Adhesion-preventing property | |
|---|---|---|---|---|---|---|---|---|---|
| | Composition of copolymer | | | | Concentration of adhesion-preventing composition (% by weight) | | | After curing | |
| | Perfluoroalkyl group-containing polymerizable compound | % by weight | Copolymerizable compound | % by weight | Concentration (% by weight) | | Solubility | at normal temperature | After curing under heating |
| 24 | $CF_3$<br>$\phantom{CF_3}\diagdown$<br>$\phantom{CF_3CF}CF(CF_2CF_2)_nCH_2CH_2OCOCH=CH_2$<br>$\phantom{CF_3}\diagup$<br>$CF_3$ | 75 | Benzyl methacrylate | 25 | 19.2 | 1 | Turbid | ▲ | △ |
| 25 | $CF_3$<br>$\phantom{CF_3}\diagdown$<br>$\phantom{CF_3CF}CF(CF_2CF_2)_nCH_2CH_2OCOCH=CH_2$<br>$\phantom{CF_3}\diagup$<br>$CF_3$ | 75 | Ethyl methacrylate | 25 | 13.6 | 1 | Turbid | ▲ | X |

Note:
*A mixture of the compounds wherein n is 3, 4 and 5 in a weight proportion of 4:2:1.

In case of the composition in an aqueous dispersion form, the test of adhesion-preventing property after curing at normal temperature is effected by immersing the top portion (10 cm) of a condenser lead wire into the composition comprising an aqueous dispersion containing 0.5 to 2% by weight of the copolymer, taking out the wire from the composition, drying it in the atmosphere (25° C.) for 5 to 10 minutes under a windless condition, heating it at 140° C. for 5 minutes, then immersing the top portion (20 cm) of the lead wire into an epoxy resin composition (viscosity 5000 c.s.), allowing it to stand for 1 minute in the atmosphere under a windless condition and observing the appearance of the wire. The determination of the adhesion-preventing property is made according to the same criteria as in the case of the composition in an organis solvent solution form.

The test of adhesion-preventing property after curing under heating is effected as in the composition in an organic solvent solution form, and the determination of the adhesion-preventing property is also made according to the same criteria.

The results are shown in Table 3.

Production of the copolymers used in the compositions in an aqueous dispersion form is carried out as in Example 10.

TABLE 3

| | | Original liquid of copolymer | | | | | | Test results Adhesion-preventing property | |
|---|---|---|---|---|---|---|---|---|---|
| | | Composition of copolymer | | | | | | After curing | |
| | | Perfluoroalkyl group-containing polymerizable compound | % by weight | Copolymerizable compound | % by weight | Concentration (% by weight) | Concentration of adhesion-preventing composition (% by weight) | at normal temperature | After curing under heating |
| Example No. | 18 | $CH_3$<br>$\phantom{C_3F_{17}SO_2N}\vert$<br>$C_3F_{17}SO_2NCH_2CH_2OCCH=CH_2$<br>$\phantom{C_3F_{17}SO_2NCH_2CH_2OC}\Vert$<br>$\phantom{C_3F_{17}SO_2NCH_2CH_2OC}O$ | 66 | Lauryl methacrylate | 33 | 23.7 | 0.5<br>1<br>2 | ○<br>○<br>◉ | ○<br>○<br>◉ |
| | 19 | $CF_3$ $\phantom{xxxxxxxxxxxx}$ OH<br>$\phantom{CF_3}\diagdown\phantom{xxxxxxxx}\vert$<br>$\phantom{CF_3}\,CF(CF_2CF_2)_3CH_2CHCH_2OCCH=CH_2$<br>$\phantom{CF_3}\diagup\phantom{xxxxxxxxxxxxxx}\Vert$<br>$CF_3\phantom{xxxxxxxxxxxxxxxxx}O$ | 80 | Stearyl acrylate | 20 | 23.0 | 0.5<br>1<br>2 | ○<br>○<br>○ | ○<br>○<br>◉ |
| Comparative Example No. | 12 | $CF_3$ $\phantom{xxxxxxxxxxxx}$ OH<br>$\phantom{CF_3}\diagdown\phantom{xxxxxxxx}\vert$<br>$\phantom{CF_3}\,CF(CF_2CF_2)_2CH_2CHCH_2OCCH=CH_2$<br>$\phantom{CF_3}\diagup\phantom{xxxxxxxxxxxxxx}\Vert$<br>$CF_3\phantom{xxxxxxxxxxxxxxxxx}O$ | 80 | Benzyl methacrylate | 20 | 23.0 | 0.5<br>1<br>2 | ▲<br>▲<br>▲ | △<br>△<br>△ |

What is claimed is:

1. A method for coating an electrical product having an electrically conductive lead wire comprising:
   coating onto said electrically conductive lead wire an aqueous suspension or an organic solution consisting essentially of a polymer of (a) at least one $C_4$ to $C_{21}$ perfluoroalkyl group-containing polymerizable compound selected from the group consisting of:

$R_fSO_2NR'OCOCR''=CH_2$;

-continued $R_f(CH_2)_nOCOCR''=CH_2;$ $R_f—\underset{\underset{R}{|}}{C}ONR'OCOCR''=CH_2;$ $R_fCH_2\underset{\underset{OH}{|}}{C}HCH_2OCOCR''=CH_2;$ $R_fCH_2\underset{\underset{OCOCR'''}{|}}{C}HCH_2OCOCR''=CH_2;$ and $R_fCH=CH(CH_2)_nOCOCR''=CH_2$ wherein $R_f$ is a $C_4$ to $C_{21}$ perfluoroalkyl group, R is a hydrogen atom or a $C_1$ to $C_{10}$ alkyl group, R' is a $C_1$ to $C_{10}$ alkylene group, R'' is a hydrogen atom or a methyl group, R''' is a $C_1$ to $C_{17}$ alkyl group and n is an integer of 1 to 10, with or without (b) at least one compound copolymerizable therewith, the content of the component (a) being not less than 40% by weight based on the weight of the polymer and (c) a solvent selected from the group consisting of an organic solvent and water to thereby form a polymer coating on said lead wires;

drying said polymer coating; and applying an epoxy resin to said article whereby the adhesion of epoxy resin to said polymer coated lead wires is prevented and whereby no material influence is exerted upon the soldering properties of said electrically conductive lead wire.

2. A method according to claim 1, wherein component (a) is present in an amount not less than 90% by weight based on the weight of the polymer.

3. A method according to claim 1, wherein said component (b) is selected from the group consisting of acrylic and methacrylic acid and esters thereof, vinyl esters of fatty acids, styrene compounds, halogenated vinyl or vinylidene compounds, allyl esters of fatty acids, vinyl alkyl ketones, acrylamides and dienes.

4. A method according to claim 3, wherein said component (b) is selected from the group consisting of acrylic esters, methacrylic esters and styrene compounds.

5. A method according to claim 1, wherein said component (b) is selected from the group consisting of $C_{12}$ to $C_{18}$ alkyl acrylates and $C_{12}$ to $C_{18}$ alkyl methacrylates.

6. A method according to claim 5, wherein said $C_4$ to $C_{21}$ perfluoroalkyl group-containing polymerizable compound is present in the range of 90:10 to 40:60 with respect to said alkyl acrylate or methacrylate.

7. A method according to claim 1, wherein said polymer is present in said aqueous dispersion or organic solution at a concentration of 0.2 to 3% by weight.

8. A method according to claim 1, wherein said electrical product is a condensor.

9. An electrical product formed by the process of claim 1.

10. A method for encapsulating an electrical product having an electrically conductive lead wire comprising the steps of:

coating onto said electrically conductive lead wire an aqueous suspension or an organic solution consisting essentially of a polymer of (a) at least one $C_4$ to $C_{21}$ perfluoroalkyl group-containing polymerizable compound selected from the group consisting of:

$R_fSO_2NR'OCOCR''=CH_2;$ $R_f(CH_2)_nOCOCR''=CH_2;$ $R_f—\underset{\underset{R}{|}}{C}ONR'OCOCR''=CH_2;$ $R_fCH_2\underset{\underset{OH}{|}}{C}HCH_2OCOCR''=CH_2;$ $R_fCH_2\underset{\underset{OCOCR'''}{|}}{C}HCH_2OCOCR''=CH_2;$ and $R_fCH=CH(CH_2)_nOCOCR''=CH_2$ wherein $R_f$ is a $C_4$ to $C_{21}$ perfluoroalkyl group, R is a hydrogen atom or a $C_1$ to $C_{10}$ alkyl group, R' is a $C_1$ to $C_{10}$ alkylene group, R'' is a hydrogen atom or a methyl group, R''' is a $C_1$ to $C_{17}$ alkyl group and n is an integer of 1 to 10, and (b) at least one compound copolymerizable therewith selected from the group consisting of acrylic and methacrylic acid and esters thereof, vinyl esters of fatty acids, styrene compounds, halogenated vinyl or vinylidene compounds, allyl esters of fatty acids, vinyl alkyl ketones, acrylamides and dienes, the content of the component (a) being not less than 40% by weight based on the weight of the polymer and (c) a solvent selected from the group consisting of an organic solvent and water to thereby form a polymer coating on said lead wires;

drying said polymer coating; and encapsulating said electrical product in an epoxy resin whereby adhesion of epoxy resin to said polymer coated lead wires is prevented and whereby no material influence is exerted upon the soldering properties of said electrically conductive lead wire.

11. A method according to claim 10, wherein said component (a) is present in an amount greater than said component (b).

12. A method according to claim 10, wherein component (a) is present in an amount not less than 90% be weight based on the weight of the polymer.

13. A method according to claim 10, wherein said component (b) is selected from the group consisting of acrylic esters, methacrylic esters and styrene compounds.

14. A method according to claim 10, wherein said component (b) is selected from the group consisting of $C_{12}$ to $C_{18}$ alkyl acrylates and $C_{12}$ to $C_{18}$ alkyl methacrylates.

15. A method according to claim 14, wherein said $C_4$ to $C_{21}$ perfluoroalkyl group-containing polymerizable compound is present in the range of 90:10 to 40:60 with respect to said alkyl acrylate or methacrylate.

16. A method according to claim 10, wherein said electrical product is a condenser.

17. An electrical product formed by the process of claim 10.

* * * * *